May 30, 1944.　　　　E. GUETZKOW　　　　2,349,959
CUTTING TOOL
Filed Feb. 20, 1941　　　3 Sheets-Sheet 1

INVENTOR:
Edward Guetzkow.
BY: W. D. O'Connor
ATTORNEY.

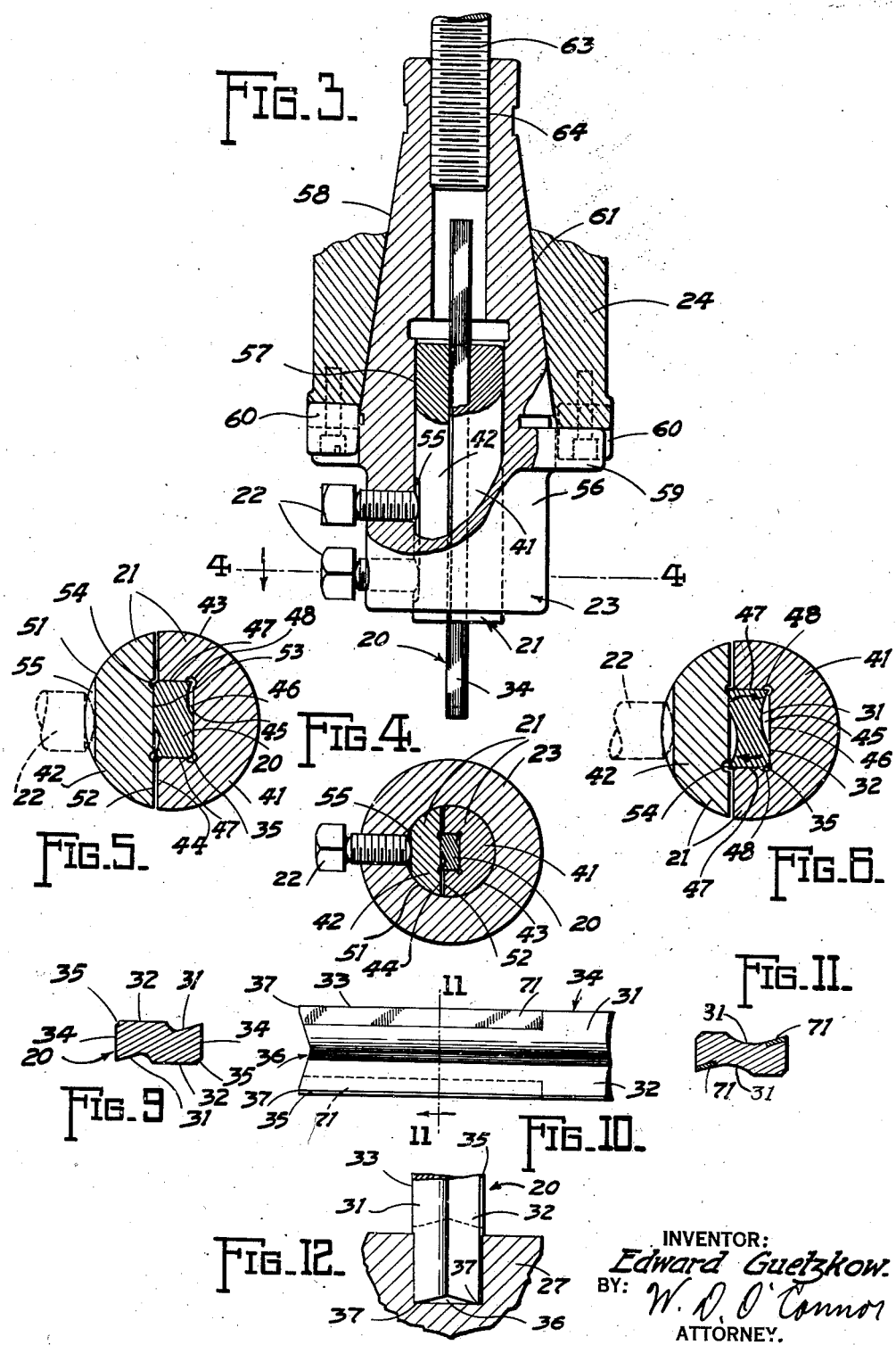

May 30, 1944.     E. GUETZKOW     2,349,959
CUTTING TOOL
Filed Feb. 20, 1941     3 Sheets-Sheet 3

INVENTOR:
Edward Guetzkow.
BY: W. D. O'Connor
ATTORNEY.

Patented May 30, 1944

2,349,959

UNITED STATES PATENT OFFICE 2,349,959

CUTTING TOOL

Edward Guetzkow, West Allis, Wis., assignor to Kearney & Trecker Corporation, West Allis, Wis., a corporation of Wisconsin Application February 20, 1941, Serial No. 379,821

17 Claims. (Cl. 90—11)

This invention relates to an improved cutting tool for machine tools and more particularly to an end mill.

The primary object of the present invention resides in the provision of an improved end mill of the solid type that is simple in form, inexpensive to manufacture, and adapted for prolonged use with a minimum cost for maintenance.

A further object of the invention resides in the provision of an improved end mill capable of production at an extremely low cost from bars of carbon steel, high speed steel, stellite, or other similar material having advantageous characteristics for metal removing purposes.

A further object of the invention lies in the provision of an end mill capable of freer cutting action by reason of its improved design.

A further object of the invention resides in the provision of an end mill having cutting edges extending the entire length of the tool.

Another object lies in the provision of an improved end mill capable, by reason of its improved design, of being utilized either as a right or left hand cutting tool by reversing its position end for end within the collet.

Another object of the invention resides in the provision of an improved collet construction whereby the end mill may be releasably retained in the position of axial adjustment best suited to provide a free length for the tool that is most advantageous for the work at hand.

Another object of the invention resides in the provision in a collet of a combination of clamping surfaces and relieved portions whereby the tool may be solidly clamped without contact with or fear of damage to the cutting edges thereof.

According to the present invention, a new and improved solid two-lipped end mill may be produced from tool steel bar stock that is obtainable in desired size and shape on the open market in rolled, cast or forged form. The term tool steel as used in the specification and claims is intended to include all materials having characteristics that render them capable of use in cutting tools. With a tool formed in accordance with the teachings of the present invention a slotting or cam grooving operation may be effected with a single pass of the tool to a degree of accuracy that has hitherto required two passes of an ordinary tool. If after repeated cutting operations, the diameter of the tool is reduced beyond the tolerance limits for a particular piece of work, the tool may be reversed end for end in the collet, reground to a smaller diameter, or reconditioned by cutting off that portion of the end which has become worn. It will readily be seen that the cost of maintaining an end mill of this type has been greatly reduced due to the fact that the waste represents only that portion of the tool which has been reduced by wear as the unused portion of the tool retains its original accurate size. The fact that the lateral cutting edges of the tool extend throughout its entire length renders the tool capable of being used as either a right or left hand cutting tool thus virtually doubling its useful life. The improved end mill of the present design provides a freer cutting tool that affords ample space for chip removal and provides a tool that may be fed into a workpiece to desired depth and then moved laterally therethrough to complete a slotting operation without requiring either a previous drilling operation to provide means of introducing the end mill, or a routing operation to finish the slot after the same has been formed. Tools of the present design have been produced in various sizes down to one-sixteenth of an inch in diameter and have been operated with entirely satisfactory results.

Other objects and advantages of the present invention, which will become apparent from the following specification, may be achieved by the forms of tool described herein by way of example in connection with the accompanying drawings illustrating the invention, in which:

Figure 1 is a perspective view of a portion of a vertical milling machine showing a workpiece being slotted by an improved cutting tool constructed in accordance with the teachings of the present invention;

Fig. 2 is an elevational view of the cutting tool, collet, collet holder and spindle nose with fragmentary parts of the vertical head, table and workpiece shown, illustrating the cutting of a slot by means of the step method wherein the slot is cut to a given depth by several passes when a small diameter tool is used to insure against tool breakage that might be caused by attempting to effect the slotting operation with a single pass of the cutter;

Fig. 3 is an enlarged elevational view of the end mill, collet, collet holder and spindle with parts broken away to disclose the structure more clearly;

Fig. 4 is a horizontal sectional view taken on the line 4—4 of Fig. 3 showing a means for releasably retaining the collet in the arbor or collet holder;

Fig. 5 is an enlarged horizontal sectional view similar to Fig. 4 showing the clamping action of the collet upon the end mill;

Fig. 6 is a horizontal sectional view similar to Fig. 5 showing the clamping action of the collet upon an end mill having a slightly modified contour;

Fig. 9 is a transverse sectional view taken on line 9—9 of Fig. 8 through a completed end mill;

Fig. 10 is a fragmentary elevational view of an end mill formed with tungsten carbide inserts to provide cutting edges having improved wearing qualities;

Fig. 11 is a transverse sectional view taken on the line 11—11 of Fig. 10 showing the tungsten carbide inserts imbedded in the body of the tool;

Fig. 12 is a diagrammatic view of an end of the cutter showing excessive wear after long use, with the dotted line indicating the reconditioned cutter effected by the removal of the worn end portion.

Figure 1:
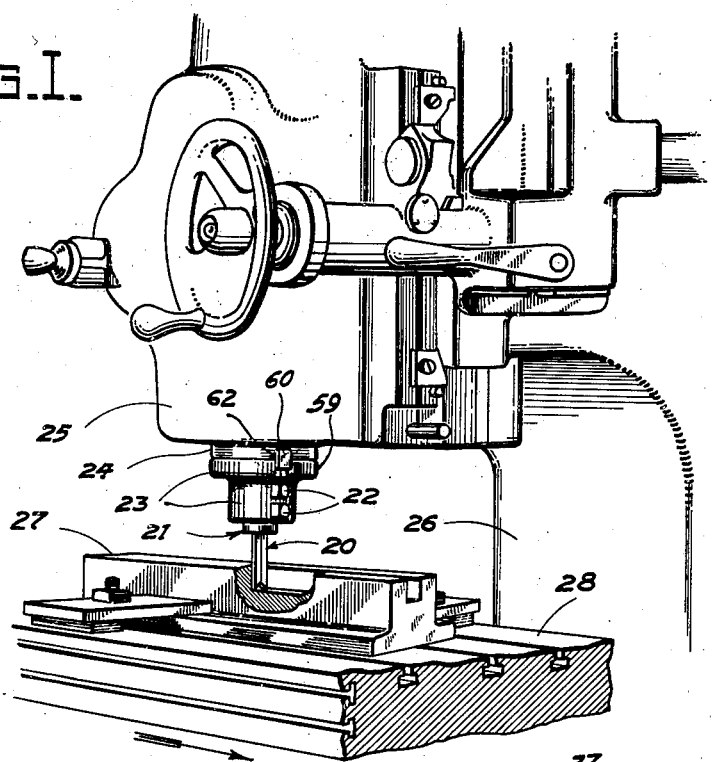

Referring to Fig. 1 of the drawings, a rotary cutting tool 20 constructed in accordance with the teaching of the present invention is releasably retained in a collet 21 by the clamping action of set screws 22 that pass through the wall of a collet holder 23. The collet holder 23 is retained in the nose of a tool spindle 24 in the manner of an ordinary arbor. The tool spindle 24 is supported and driven in the usual manner in an adjustable head 25 mounted on ways on the face of a column 26 of a vertical milling machine. The cutting tool 20 is shown milling a slot in a workpiece 27 that is clamped on the face of a table 28 mounted for movement on the knee (not shown) of the milling machine in accordance with standard practice.

Figures 2, 7:
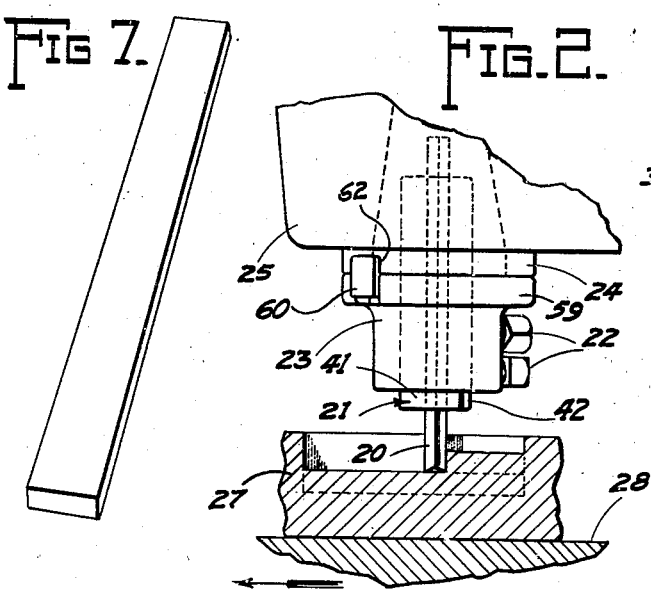
Fig. 7 is a perspective view of a piece of bar stock from which an end mill of the present invention may be fashioned.

The cutting tool or milling cutter 20 comprises a relatively long piece of flat bar stock having a width substantially greater than its thickness and adapted for rotation about its longitudinal axis. As previously stated, the stock for producing the cutting tools may be purchased in any desired dimensions and contour with the result that the labor cost of producing the finished cutting tool is reduced to a minimum. If flat bar stock, such as is shown in Fig. 7, is utilized, the method of forming the tool comprises the milling of a longitudinally disposed groove or flute 31 extending from one end of the tool to the other in each of the wide sides of the bar. The flute 31 in each wide side of the bar extends inwardly from one longitudinal edge and terminates in the proximity of the center of the side to divide the same into a concave surface 31 and a plain surface 32. A cutting edge 33 is formed along the line of junction between the groove 31 and the adjacent narrower side face 34 of the tool 20. Another cutting edge 33, similarly formed on the other wide side of the tool, is disposed on the opposite side of the longitudinal center of the tool so that the two cutting edges are positioned on longitudinally disposed diagonal corners of the tool. The remaining pair of longitudinally disposed diagonal corners or heels 35 of the cutter 20 are each chamfered in such manner as to serve as guides to prevent chattering of the tool and insure a good quality of finish to the wall of the slot or groove being milled in the workpiece 27. Both ends of the tool 20 are identically shaped to form fish tail cutting lips, each end presenting a relatively shallow V-shaped notch 36 having its vertex lying in the transverse center and disposed toward the longitudinal center of the tool. The notch 36 is provided with side walls that extend outwardly toward the sides 34 and terminate in flat faced tips 37 lying in a plane normal to the sides 34 of the tool 20. The sides of the notch 36 and the tips of the tool formed by the flat faces 37 are provided with cutting edges 38, Fig. 8, extending respectively from the lateral cutting edges 33 inwardly to the vertex of the notch 36 so that the tool may be fed into the workpiece as a drill, the flat tips 37 providing a smooth finish for the bottom of the groove or slot being milled in the workpiece.

Figure 8:
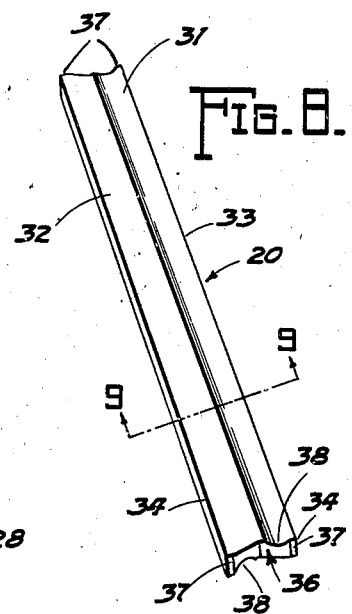
Fig. 8 is a perspective view of a piece of bar stock provided with a longitudinally disposed flute on each of two opposite sides, the flutes and adjacent sides of the bar stock meeting to form lateral cutting edges on diagonally opposite corners, and having end portions with cutting edges extending inwardly from the lateral cutting edges.

If the tool stock is obtained in the form shown in Fig. 8, with the flutes 31 already formed, the steps of finishing the tool comprise the grinding of the faces 31, 32 and 34 to bring the tool to accurate finish dimensions. The cutting edges 33 are formed by the grinding of faces 31 and 34. The chamfer 35 may then be formed on the longitudinal edges made by the junction of faces 32 and 34. The fish tail ends including the V-shaped notch 36, the flat faced tips 37, and the cutting edges 38 may then be formed to complete the tool.

In the form of tool 20 shown in transverse section in Figs. 4, 5 and 9, it will be noted that the plain surfaces 32 formed on the wider sides of the tool extend beyond the longitudinal center of the cutter thus forming overlapping parallel surfaces on the opposite sides of the tool. The overlapping portions of the surfaces 32 provide an area against which the parts of the collet 21 bear to clamp the tool 20 securely against movement in the collet 21.

In the form of tool shown in transverse section in Figs. 6 and 11, it will be noted that the flutes 31 formed on the wider sides of the tool extend beyond the longitudinal center of the cutter and that the plain surfaces 32 are relatively narrow. When a tool of this type is secured in the collet 21, the cutter tends to kant as indicated by the arrows in Fig. 6, due to the offset bearing relationship between the cooperating parts of the collet 21, and hence the clamping action of the collet 21 is distributed to four sides of the cutter in place of two as is the case in the form of cutter shown in Figs. 4, 5 and 9.

The collet 21 comprises two members 41 and 42 which when matched form a relatively long substantially cylindrical tool holding means. The member 41 is provided with a cylindrical surface 43 and a plain surface 44. An axially disposed slot 45 extending the full length of the member 41 and centrally located in the surface 44 serves to receive the tool 20. The slot 45 is provided with a base wall 46 and a pair of side walls 47 that lie perpendicular to the base 46 of the slot 45. Relief grooves 48 are formed, for preventing contact between the cutting edges 33 of the tool and the collet 21, along the line of junction between the side walls 47 and the base 46 of the slot 45. The depth of the slot 45 is such that when one of the surfaces 32 of the cutter 20 lies in contact with the base 46 of the slot 45, the tool 20 will be centrally disposed with respect to the cylindrical surface 43 of the member 41. The width of the slot is such that a snug sliding fit is provided between the surfaces 34 of the tool 20 and the side walls 47 of the tool receiving slot 45 in order to retain the tool against lateral movement from its central position in the member 41. The mating member 42 of the collet 21 includes a cylindrical surface 51 having the same radius as the surface 43 of the member 41 and a plain surface 52. The surface 52 includes a central portion 53 extending the entire length of the member 42 arranged to contact the exposed surface 32 of the tool 20 that is slidably received in the slot 45 of the companion piece 41 of the collet 21. The surface 53 is bounded on its longitudinal sides by parallel grooves 54 that are spaced apart a distance substantially equal to the width of the tool 20. The grooves 54 serve as relief grooves in the same manner as the grooves 48 and prevent actual contact between the cutting edge 33 and the member 42 of the collet 21.

The cylindrical surface 51 of the collet member 42 is provided with a flat surface 55 disposed in parallel relationship with the tool contacting surface 53. The surface 55 provides a contact face for the ends of the set screws 22 that are threaded through a neck portion 56 of the collet holder 23. The set screws 22, when tightened, provide means for simultaneously applying a clamping pressure to retain the tool 20 in desired position of axial adjustment between the members of the collet 21 and retaining the collet 21 in an axially disposed cylindrical bore 57 formed in the collet holder 23.

The collet holder 23 is also provided with a tapered shank portion 58 and a flange portion 59. The shank portion 58 is arranged to be received in a tapered bore 61 formed in the nose of the spindle and the flange 59 is provided with recesses adapted to receive the extended portions of driving blocks 60 arranged to be releasably retained, in the usual manner, in a slot 62 that extends diametrically across the end of the nose of the spindle 24.

The collet holder 23 is releasably retained in accurate alignment in the spindle 24 by means of a draw-in rod 63 passing through the head 25 and functioning in the usual manner with one end threaded into a centrally disposed bore 64 formed in the collet holder 23. The bore 64 is aligned with the collet receiving bore 57 and provides a recess into which the unused portion of the tool 20 extends.

Figure 2 in the drawings illustrates a particularly advantageous use of an end mill, constructed in accordance with the teachings of the present invention, that being the step method of milling a relatively deep slot with a small diameter cutting tool. The improved end mill herein disclosed comprises a two-lipped cutter having a substantially rectangular transverse cross section providing ample strength and adequate chip clearance. The end mill 20 may be inserted into the collet 21 to a position in which the exposed end of the cutter is of a length sufficient to provide a moderate amount of clearance between the collet and the workpiece in addition to the depth of cut to be taken on a single pass of the tool. When the tool 20 has been adjusted with the proper free length extending from the collet, the set screws 22 may be tightened to releasably retain the collet 21 in the collet holder 23 and clamp the tool 20 securely between the members 41 and 42 of the collet 21. With the cutter 20 rotating, the head 25 may be fed downwardly to sink the cutter to the desired depth in the workpiece and the table feed may then be engaged to effect the initial step of the slotting operation. As shown in Fig. 2, the tool is in the process of taking the second cut. Upon completion of the second cut, the tool 20 may be withdrawn from the workpiece by elevating the head 25. The set screws 22 may be loosened to permit the tool 25 to be extended sufficiently to permit its reaching the required depth to finish the slot. The set screws 22 may be tightened to clamp the tool 20 in its extended position and the cutting operation repeated to finish the slot. In instances such as the one just described, where relatively deep slots are cut with a small diameter cutter, the simple means for effecting axial adjustment of the end mill not only facilitates the use of the step method but also effects great savings in tool breakage that normally result from overloading a slender tool having an excessive unsupported cutting length.

The form of end mill 20 shown in Figs. 10 and 11 is similar in cross section to that shown in Fig. 6. The particular difference lies in the provision of tungsten carbide inserts 71 applied to body of the end mill to form cutting edges 33 adapted for faster cutting speeds and greater durability. The flutes 31 are recessed to receive the tungsten carbide strips 71 that are bonded in place in the usual manner.

Figure 13:
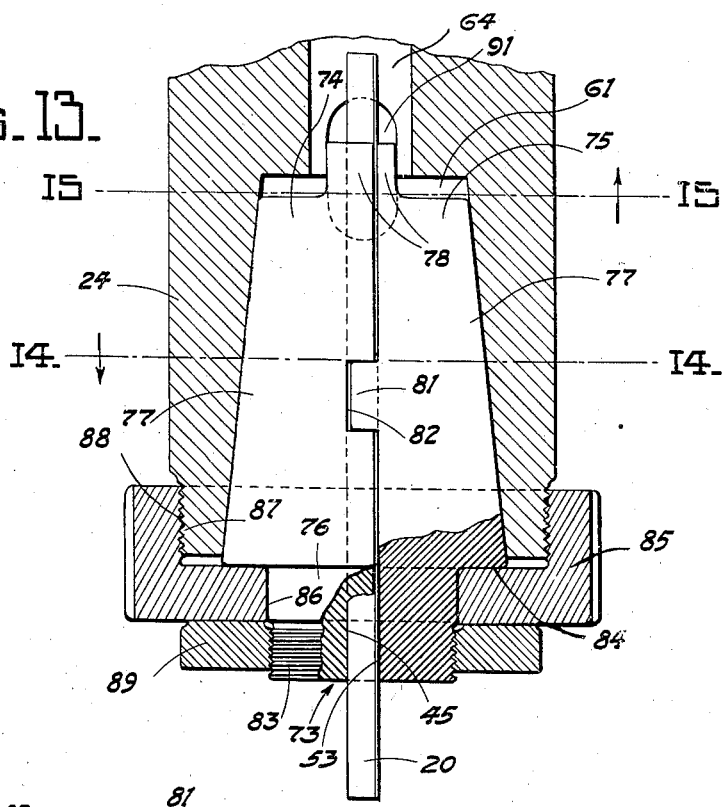
Fig. 13 is an axial sectional view through the nose of a spindle showing a modified form of collet together with means for releasably retaining the same in the spindle.
Figure 14:
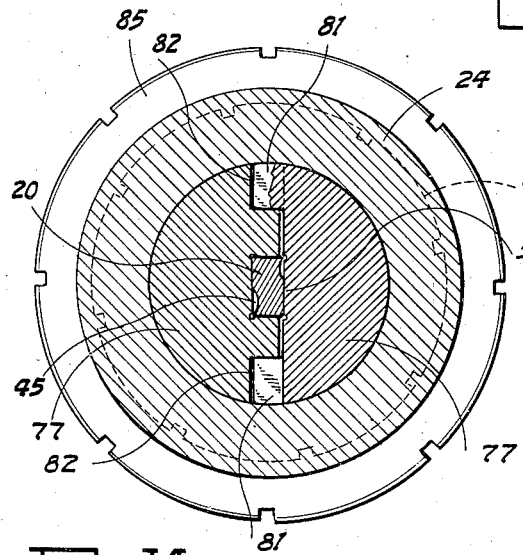
Fig. 14 is a transverse sectional view taken on the line 14—14 of Fig. 13 showing a means for retaining the collet members against relative axial movement.
Figure 15:
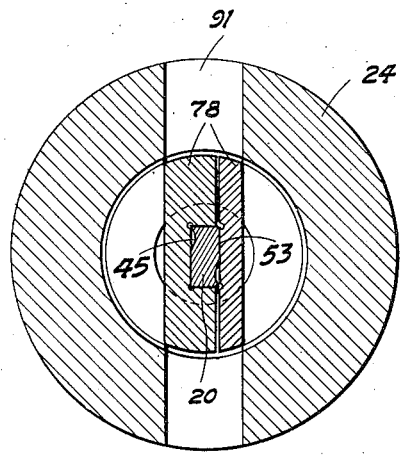
Fig. 15 is a transverse sectional view taken on the line 15—15 of Fig. 13 showing the power transmitting tang connection between the spindle and collet.

A modified form of collet 73 and collet retaining means is shown in Fig. 13 of the drawings. The collet 73 comprises two members 74 and 75 arranged in cooperating relationship to form a relatively long tool holding means adapted for releasable retention in tool holding position in the tapered hole 61 formed in the nose of the spindle 24. The members 74 and 75 are separable in a plane disposed parallel with the axis of the collet and each member is provided with portions and surfaces that cooperate with those of the companion member to form a cylindrical head, a tapered shank and flat sided tang portions 76, 77 and 78 respectively. The members 74 and 75 are further provided respectively with the tool receiving slot 45 and tool contacting surface 53 formed in the manner referred to in the description of the collet 21. The shank portions 77 of the members 74 and 75 are provided respectively on their mating faces with ears 81 and recesses 82. The ears 81 are arranged to be received in the recesses 82 when the members 74 and 75 are joined to provide a releasable connection between the members that will retain them against relative axial movement. The head portions 76 of the members 74 and 75 when joined form a cylindrical portion that is provided with a threaded portion 83 and a shoulder 84. The shoulder 84 forms an abutment for a nut 85 that is provided with a centrally disposed opening 86 receivable over the end of the head 76 and an internally threaded portion 87 receivable on threads 88 formed on the lower end of the tool spindle 24. The nut 85 serves to draw the shank portions 77 of the collet members 74 and 75 into engagement with the tapered hole 61 in the spindle 24 to effect the clamping of the tool 20 in desired position of axial adjustment between the members 74 and 75 and in accurate alignment with the spindle 24. A jamb nut 89 receivable on the threaded portion 83 of the collet 73 serves to lock the collet 73 in the tool spindle 24. The tang portions 78 on the collet members 74 and 75 are receivable in a vertically disposed slot 91 that extends transversely of the spindle 24 and arranged to pass through the upper part of the tapered collet receiving bore 61 and the lower part of the bore 64. The cooperating relationship between the tang 78 and the slot 91 serves to provide the power transmitting connection between the spindle 24 and the tool holding collet 73 to relieve the collet holding means of any driving strain.

In the foregoing specification, mention has been made of the reduced cost of manufacture and the low cost of maintenance of the improved end mill of the present invention. In practice, a series of end mills of various standard sizes are produced together with collets for receiving the end mills. In the event that one end of the end mill has been worn to a size below the tolerance limits for the particular piece of work at hand, the tool may be reversed end for end in the collet and by reversing the direction of spindle rotation the tool may be retained in service for an extended period of time. After both ends of the end mill have been worn, the end mill may be reground to give continued service at a reduced size, or the ends of the tool may be refinished by cutting off the worn portions to present unused portions of the cutting edges which have retained their original accurate size. Since the lateral cutting edges of the end mill extend the full length of the tool, and as the tool is axially adjustable in the collet, virtually the entire length of the tool may be consumed through long periods of use and numerous regrinding and cutting off operations before the end mill has outlived its usefulness.

From the foregoing description of the construction and operation of the several forms of the invention, it will be apparent that there has been provided a new and improved cutter for a milling machine that may be produced from a piece of bar stock in a simple and inexpensive manner. The end mill is of the two-lipped variety having a substantially rectangular cross section and capable of boring to a depth in a workpiece in addition to effecting a slotting or cam grooving operation. The new end mill is further provided with cutting edges extending the full length of the tool in a manner to form a double ended cutter adapted for end for end reversal in the collet to provide selectively a right or left hand cutting tool. The collets shown and described are of improved types adapted to releasably retain the end mill in a selected position of axial adjustment so that the free end or cutting length of the end mill may be adjusted in accordance with the requirements of the work at hand. The collets are further provided with tool engaging surfaces for clamping the tool solidly in the collet and relief grooves are positioned in a manner to insure against either contact with or damage to the cutting edges of the tool when the collet members are in tool clamping relationship.

While the invention has been shown and described as an end mill for a milling machine it is to be understood that it may be incorporated to advantage as a cutting tool for other machines.

Although several forms of the invention have been shown and described in considerable detail as exemplary of the manner in which the invention may be practiced, it will be apparent to those skilled in the art to which this invention relates that other forms of the invention may be utilized without departing from the spirit and scope of the invention as defined in the subjoined claims.

I claim:

1. A rotary cutting tool comprising a relatively long piece of flat bar stock of uniform transverse section adapted for rotation about its longitudinal axis and having a lateral cutting edge extending the entire length of said tool, and an end including a cutting edge disposed to lie in a plane normal to the lateral cutting edge.

2. A rotary cutting tool comprising a relatively long piece of flat bar stock of uniform transverse section arranged to be rotated about its longitudinal axis and having a pair of lateral cutting edges extending the entire length of said tool and disposed on diagonally opposed longitudinal edges thereof, and an end including a cutting edge disposed to lie in a plane normal to the lateral cutting edges.

3. A milling cutter adapted to rotate about its own axis, comprising a relatively long piece of bar stock of uniform transverse section having a pair of relatively wide sides and a pair of narrower sides, said wide sides each including a plain and concave surface extending the length of said cutter, a pair of lateral cutting edges formed respectively by the junction of each of said concave surfaces with said adjacent narrower side, and an end including a cutting edge disposed to lie in a plane normal to the lateral cutting edges.

4. A milling cutter adapted to be rotated about its own longitudinal axis, comprising an relatively long piece of bar stock of uniform transverse section having a pair of relatively wide sides and a pair of narrower sides, said wide sides each including a plain and a concave surface extending the length of said cutter, a pair of lateral cutting edges disposed on diagonally opposed longitudinal edges of said cutter, said cutting edges being formed respectively by the junction of each of said concave surfaces with said adjacent narrower side, and an end including a cutting edge disposed to lie in a plane normal to the lateral cutting edges.

5. An end mill comprising a relatively long piece of flat bar stock material of uniform transverse cross section having a pair of ends including cutting edges extending the width of said ends, and having a pair of longitudinally arranged lateral cutting edges extending the entire length of said end mill thereby forming a double ended tool adapted for rotation about its longitudinal axis and for use selectively as a right or left hand end mill.

6. An end mill comprising a relatively long piece of flat bar stock of uniform transverse cross section having a pair of cutting edges arranged on diagonal longitudinal corners of said end mill and extending the entire length of said end mill, and a pair of duplicate ends having cutting edges formed thereon, thereby forming an end mill adapted for rotation about its longitudinal axis and for selective use as a right or left hand tool by utilizing one or the other end of said end mill.

7. A cutting tool capable of being utilized selectively as a right or left hand cutter, said tool comprising a relatively long flat bar of material of uniform shape in transverse section having a pair of cutting edges disposed longitudinally and co-extensive wtih the length of said tool and having duplicate ends including V-shaped notches having flat faced tips arranged normal to said longitudinal cutting edges, said ends including cutting edges for effecting the removal of material whereby said tool may be fed to a depth in a workpiece when rotating about its longitudinal axis and have relative movement imparted between said tool and workpiece in a path normal to the axis of tool rotation, whereby a slot may be completely formed with a single pass of the tool.

8. A cutting tool capable of being utilized selectively as a right or left hand cutter when rotated about its longitudinal axis, said tool comprising a relatively long bar of stock of uniform shape in transverse section having a pair of relatively wide sides and a pair of relatively narrow sides, said wide sides each including a plain and concave surface co-extensive with the length of said tool, a cutting edge formed at the junction between each of said concave surfaces and said adjacent relatively narrow side face, said cutting edges being disposed longitudinally and co-extensively with the length of said tool and having duplicate ends including V-shaped notches having flat faced tips arranged normal to said longitudinal cutter edges, said ends including cutting edges for effecting the removal of material whereby said tool may be fed to a depth in a workpiece and have relative movement imparted between said tool and workpiece in a path normal to the axis of tool rotation, whereby a slot may be completely formed with a single pass of the tool.

9. An end mill assembly comprising a solid cutter having a flattened substantially uniform cross section and having a pair of longitudinally disposed cutting edges on diagonally opposite corners for effecting milling operations when rotated about its longitudinal axis, a collet comprising two elements, a cutter receiving slot in one of said collet elements, said second collet element being adapted to contact one face of said cutter, a collet holder, an opening in said collet holder adapted to receive said collet, and adjustable means adapted to exert a clamping pressure between said collet elements whereby said cutter is releasably retained in said collet and said collet in said collet holder.

10. A cutting tool assembly for milling machines including a relatively long cutter bar adapted for rotation about its longitudinal axis having a pair of ends including cutting edges extending the entire width of said cutter and lateral cutting edges extending the entire length of said cutter, a collet including a pair of relatively long elements each being partially cylindrical in cross-section and having flat adjacent faces, one of said elements having an axially disposed cutter receiving slot arranged to slidably receive said cutter in a manner to center the same in said collet and to expose one side thereof, the flat face of said other element being adapted to contact the exposed side of said cutter, and adjustable collet engaging means adapted to exert a clamping pressure between said collet elements whereby said cutter is clamped in selected axial relationship with said collet.

11. A cutting tool assembly for a milling machine including a relatively long solid cutter bar of uniform shape in transverse section having a pair of ends including cutting edges co-extensive with the width thereof and having a pair of lateral cutting edges co-extensive with the length thereof, a collet for receiving said cutter to rotate it about its longitudinal axis, said collet including a pair of relatively long elements each being partially cylindrical in cross-section and having a flat face, one of said elements including an axially arranged cutter receiving slot having a depth less than the cutter thickness, the flat face of said other element being adapted to contact the exposed surface of said cutter, and adjustable collet engaging means for exerting a clamping pressure between said collet elements whereby said cutter is releasably retained in adjusted axial relationship with said collet to provide a suitable cutting length for said tool.

12. A cutting tool assembly for a milling machine including a relatively long flat cutter bar of uniform shape in transverse section having a pair of ends including cutting edges co-extensive with the width thereof and having a pair of lateral cutting edges co-extensive with the length thereof, a collet for receiving said cutter to rotate it about its longitudinal axis, said collet including a pair of relatively long elements each being partially cylindrical in cross-section and having a flat face, one of said elements including an axially arranged cutter receiving slot having a depth less than the cutter thickness, relief grooves formed at the junction of the base and side walls of said slot whereby contact with the cutting edge of said tool is precluded, the flat face of said other element being adapted to contact the exposed surface of said cutter, relief grooves formed along the sides of said cutter contacting surface to preclude contact with the cutting edge of said tool, and adjustable collet engaging means for exerting a clamping pressure between said collet elements whereby said cutter is releasably retained in adjusted axial relationship with said collet to provide a suitable cutting length for said tool.

13. The combination with a rotatable spindle and a collet holder, of a collet and a cutting tool, said collet comprising a pair of relatively long elements which when associated form a cylindrical collet, one of said elements having an open sided tool receiving slot axially arranged to center said tool in said collet for rotation about its longitudinal axis, said other element having a flat tool contacting surface disposed in alignment with the open side of said tool receiving slot, a cutting tool comprising a relatively long piece of bar stock material of uniform transverse cross-section having an end including cutting edges for material removal extending the width of said cutting tool whereby said tool may be fed to a depth in a workpiece, said cutting tool having a pair of lateral cutting edges for material removal extending the entire length of said tool whereby said tool may be fed in a plane normal to the axis of tool rotation, and means for releasably retaining said cutting tool in adjusted position within said collet whereby the cutting length of said tool may be adjusted to meet the requirements of the work at hand.

14. The combination with a rotatable tool spindle and a collet holder, of a collet and a cutting tool, said collet comprising a pair of elements having cylindrical surfaces and flat surfaces, said elements forming together a cylindrical collet when said flat surfaces are in matching relationship, an axially arranged tool receiving slot formed in said flat surface of one of said elements, said tool receiving slot having a depth less than the thickness of said cutting tool, said flat surface of said other element being arranged to contact the exposed surface of said tool to support it for rotation abouts its longitudinal axis, said tool comprising a relatively long solid bar of material having a substantially uniform transverse section and provided with a pair of lateral cutting edges extending the entire length of said tool, said cutting tool being slidably receivable in said tool receiving slot to any position of axial adjustment, and adjustable means in said collet holder for exerting a clamping pressure on said collet elements whereby said collet is anchored in said collet holder and said cutting tool is releasably retained in adjusted axial position in said collet.

15. An end milling cutter especially adapted for use on a machine tool to machine a slot of accurately predetermined width in a single operation by feeding the end thereof laterally into a workpiece while it is rotating about its longitudinal axis, comprising a flat bar of tool steel of substantially uniform cross section having its diametrically opposed corners shaped to present longitudinal cutting edges formed thereon in accurately predetermined parallel relationship and extending from end to end thereof, whereby whenever the active end thereof becomes worn to a condition in which the slot formed thereby is too narrow the worn end may be cut away to present previously unused portions of said cutting edges thereby restoring the cutting action to the original accurately predetermined width.

16. A double ended milling cutter adapted to effect lateral slotting and longitudinal boring operations upon being rotated about its longitudinal axis and capable of being reconditioned by grinding away its ends, comprising a piece of substantially flat bar stock having a uniform cross section throughout its length and shaped to present cutting edges along diagonally opposed longitudinal corners adapted to effect lateral milling, said cutter being formed at each end to present cutting edges according with said longitudinal cutting edges and adapted to effect longitudinal boring, whereby the ends of said cutter may be utilized selectively for performing milling operations with right hand or left hand rotation respectively and either end may be reconditioned to its original effective diameter by grinding away worn portions thereof.

17. An end milling tool adapted for both axial and lateral cutting operations when rotated about its longitudinal axis, comprising an elongated piece of substantially flat bar stock shaped to present longitudinally extending cutting edges along diagonally opposed corners thereof for lateral milling, and having its ends formed to present cutting edges for longitudinal boring and arranged for use selectively when operating said cutter in opposite directions of rotation respectively, said tool being adapted to have worn portions of its ends ground away to reestablish its original condition.

EDWARD GUETZKOW.